United States Patent
Sivaswamy et al.

(10) Patent No.: US 11,546,181 B1
(45) Date of Patent: Jan. 3, 2023

(54) CONTEXTUALLY DRIVEN DIVERSION ENHANCEMENT FRAMEWORK

(71) Applicant: International Business Machines Corporation, Armonk, NY (US)

(72) Inventors: Hemant Kumar Sivaswamy, Pune (IN); Venkata Vara Prasad Karri, Visakhapatnam (IN); Shikhar Kwatra, San Jose, CA (US); Kiruthikalakshmi Periasamy, Erode (IN); Aparna Seshadri, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/473,158

(22) Filed: Sep. 13, 2021

(51) Int. Cl.
*H04N 7/15* (2006.01)
*H04L 12/18* (2006.01)
*H04W 4/021* (2018.01)

(52) U.S. Cl.
CPC ........... *H04L 12/1822* (2013.01); *H04N 7/15* (2013.01); *H04W 4/021* (2013.01)

(58) Field of Classification Search
CPC .......... H04L 12/18; H04W 4/021; H04N 7/15
USPC ............................................ 348/14.01–14.16
See application file for complete search history.

(56) References Cited

U.S. PATENT DOCUMENTS

| | | | |
|---|---|---|---|
| 11,363,237 B1* | 6/2022 | Block | H04N 7/15 |
| 2016/0148016 A1 | 5/2016 | Rylski | |
| 2016/0205344 A1 | 7/2016 | Suzuki | |
| 2018/0365809 A1 | 12/2018 | Cutler | |
| 2019/0087646 A1 | 3/2019 | Goulden | |
| 2020/0098096 A1 | 3/2020 | Moloney | |
| 2020/0186727 A1* | 6/2020 | Denoue | G06V 40/172 |
| 2021/0306561 A1* | 9/2021 | VanBlon | H04N 5/272 |
| 2022/0036708 A1* | 2/2022 | Rey | G06V 40/173 |

FOREIGN PATENT DOCUMENTS

| | | |
|---|---|---|
| CN | 105704440 A | 6/2016 |
| CN | 111527530 A | 8/2020 |
| CN | 112541870 A | 3/2021 |
| CN | 112800947 A | 5/2021 |
| CN | 113168511 A | 7/2021 |
| WO | 2019118933 A1 | 6/2019 |

OTHER PUBLICATIONS

Anonymously, "Method and System for Monitoring Behavior of a Subject and Accordingly Directing the Subject Using Visual Cues," IP.com No. IPCOM000204379D, Feb. 2011, 4 pages.

(Continued)

*Primary Examiner* — Melur Ramakrishnaiah
(74) *Attorney, Agent, or Firm* — VanLeeuwen & VanLeeuwen; Matthew C. Zehrer

(57) ABSTRACT

An approach is provided in which the approach establishes a geo-fence around a user in response to the user invoking a video conversation corresponding to a conversational context. The approach determines an action in response to detecting an entity crossing the geo-fence. The action is based on the entity and the conversational context of the video conversation. The approach invokes the action by transmitting a message to a device in proximity to the entity.

15 Claims, 9 Drawing Sheets

(56) References Cited

OTHER PUBLICATIONS

Anonymously, "Method and system to avoid embarrassing guest appearance on a video call," IP.com No. IPCOM000264561D, Jan. 2021, 4 pages.
Borcan, "Virtual Background For Video Conferencing In Python and OpenCV—A Silly Approach," Medium, Mar. 2020, 8 pages.
Gautam et al., "Intelligent Infant Monitoring System," Columbia University, EECS E4764 Fall'16 Internet of Things, Intelligent and Connected Systems, Team 4 Project Report, 2016, 22 pages.
Hillgrove-Stuart et al., "Toy-mediated distraction: Clarifying the role of distraction agent and preneedle distress in toddlers," Pain Research and Management, vol. 18 No. 4 Jul./Aug. 2013, pp. 197-202.
Hare, "How to work from home with kids around," Poynter Institute, COVID-19 Poynter Resources, Mar. 2020, 32 pages.
"IBM Transforms Workplace Experiences With New AI Capability For Intelligent Real Estate And Facility Management," International Business Machines Corporation, IBM News Room, Jan. 2020, 3 pages.
International Search Report and Written Opinion for International application No. PCT/CN2022/113821, International Searching Authority, Beijng, China, dated Nov. 2, 2022, 9 pages.

\* cited by examiner

```
NOTIFICATION AND DISTRACTION CONFIGURATION WINDOW 700

USER NOTIFICATION SETTINGS

Transmittal Message:  [I'm on a video call. Please do not
                           come into the room.]  — 705

Entity A: [Jane] — 710
            ID: [123-456-7890] — 715
       Contact: [Text] [123-456-7890]
       720 —         — 725

Entity B: [Bill] — 730
            ID: [234-456-7412] — 735
       Contact: [Text] [234-456-7412]
       740 —         — 745

DISTRACTION SETTINGS

Entity X: [Billy] — 750
            ID: [3245] — 755
       Distraction: [Turn on Toy Car] — 760

Entity Y: [Sally] — 765
            ID: [6582] — 770
       Distraction: [Turn on Children's
                     cartoon on TV] — 775

[APPLY SETTINGS] — 790
```

*FIG. 7*

CONTEXTUALLY DRIVEN DIVERSION ENHANCEMENT FRAMEWORK

BACKGROUND

Communication between people is critical, required, and vital to a business's success. Conferencing sessions, such as video conferencing, have evolved over the years and have vastly improved communications between organizations, customers, and suppliers. Video conferencing minimizes travel time, travel costs, and allows participants in different locations to view/edit the same electronic document. In addition, video conferencing allows a participant to see other participants' visual cues that are not available during a traditional telephone conversation.

The advancement of network technology and personal device technology has caused an exponential growth in video conferencing. Video conferencing systems allow users to conduct live audio/video discussions for meetings, training events, lectures, presentations, or personal conversations using web-connected devices. Users conduct live video conferences using common devices having a microphone, a camera, and a display, such as a desktop computer, a laptop computer, a smart phone, and etcetera.

Web conferencing includes various types of online conferencing and collaborative services including webinars ("web seminars"), webcasts, and web meetings. In general, web conferencing is made possible by Internet technologies, particularly on TCP/IP connections and services that allow real-time point-to-point communications as well as multicast communications from one sender to many receivers.

BRIEF SUMMARY

According to one embodiment of the present disclosure, an approach is provided in which the approach establishes a geo-fence around a user in response to the user invoking a video conversation corresponding to a conversational context. The approach determines an action in response to detecting an entity crossing the geo-fence. The action is based on the entity and the conversational context of the video conversation. The approach invokes the action by transmitting a message to a device in proximity to the entity.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 7 is an exemplary diagram of a notification and distraction configuration window that the user utilizes to configure notifications and distractions for individual entities;

DETAILED DESCRIPTION

Figure 1:
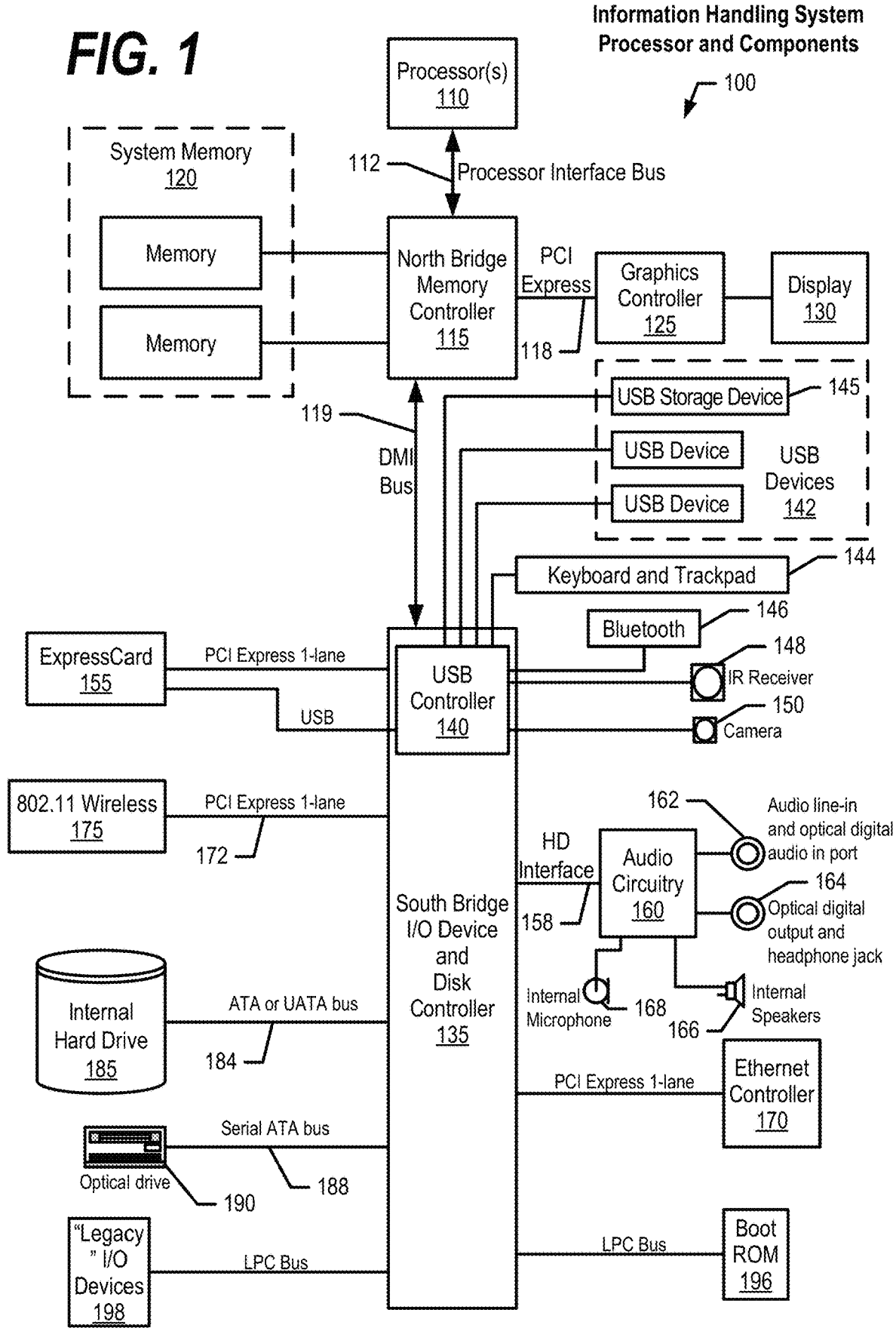
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, and etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
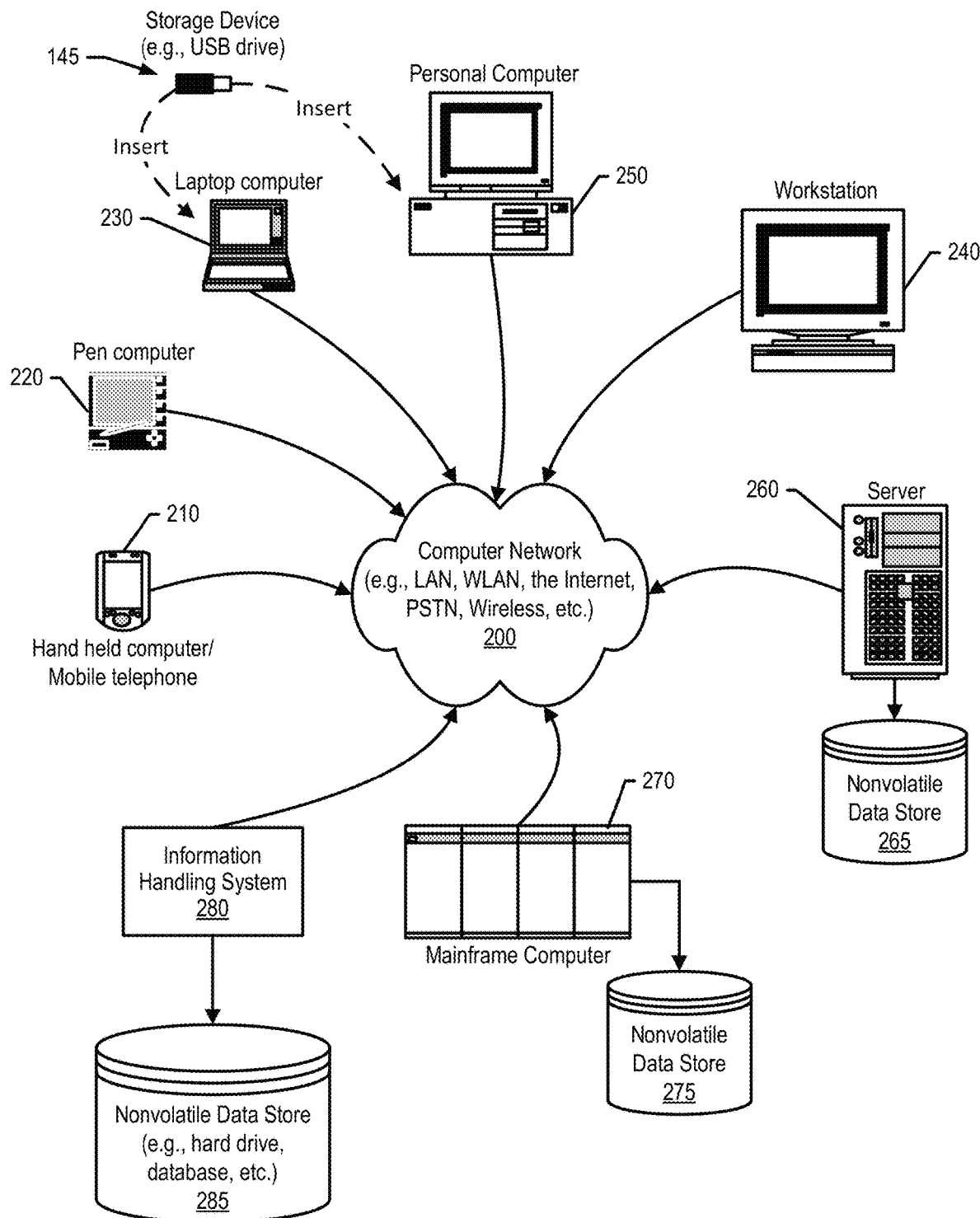
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, video conferencing plays an important role in optimizing business communication. Video conference participants, however, may be interrupted by nearby personnel from time to time for urgent and not urgent matters. In addition, as user conduct video conferencing at home, the user may be interrupted by family members, pets, etc., while the user is conducting a video conversation.

FIGS. 3 through 9 depict an approach that can be executed on an information handling system that invokes actions based on video conversation contextual understanding when an entity (person, pet, etc.) crosses a geo-fence (virtual perimeter) established when a user is on a video conversation. In one embodiment, the approach uses Internet of Things (IoT) devices/sensors to track entity activity and movement and, based on the sensing, the approach triggers and sends notifications and/or diversion actions to distraction devices such as a smart TV, an electronic moving toy, or any other preferred distraction device.

Figure 3:
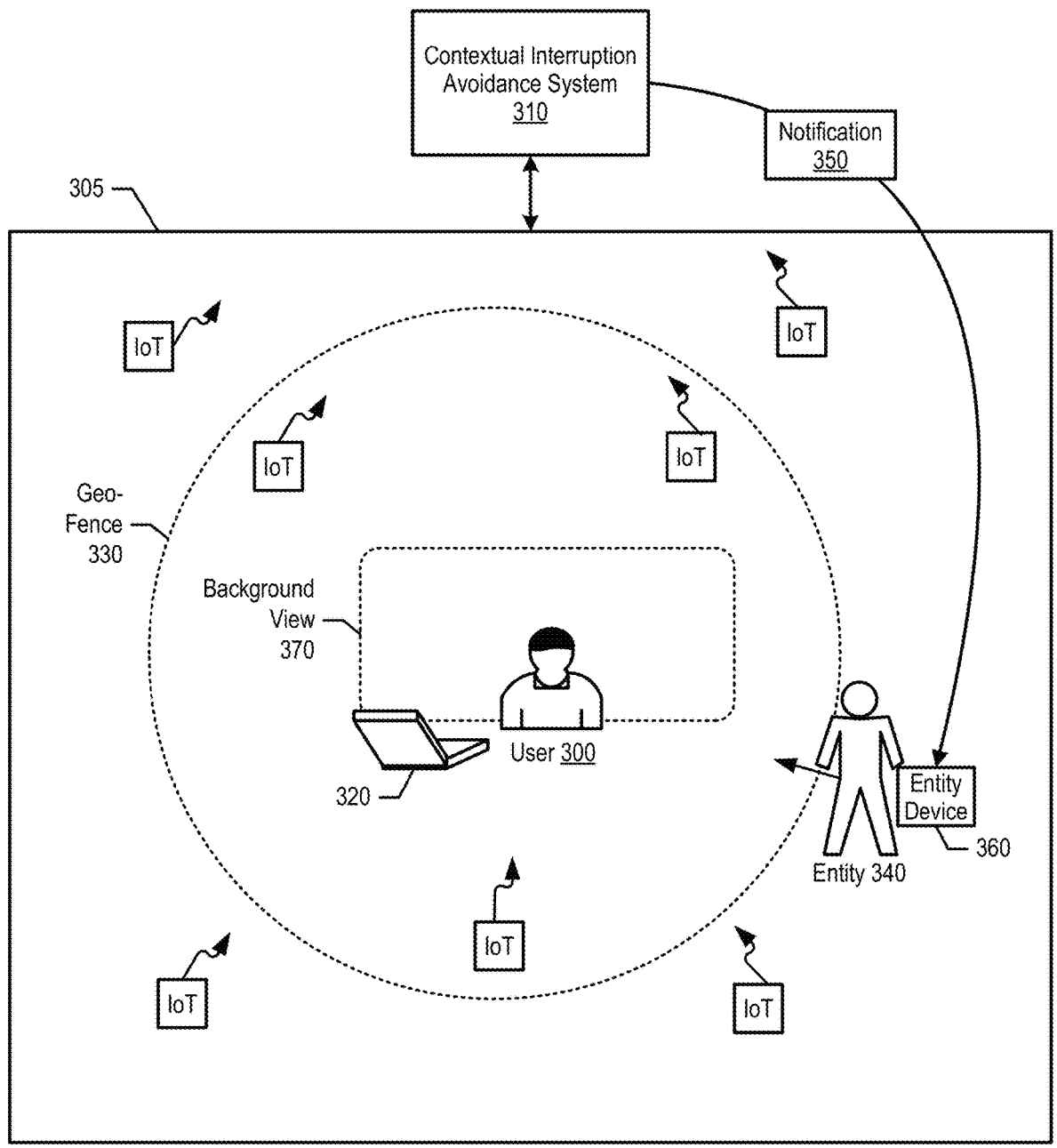
FIG. 3 is an exemplary diagram depicting a user conducting a video conversation while a contextual interruption avoidance system monitor's the user's surroundings and sends a notification to an approaching entity.

FIG. 3 is an exemplary diagram depicting a user conducting a video conversation while a contextual interruption avoidance system 310 monitor's the user's surroundings and sends a notification to an approaching entity. User 300 joins a video conversation in area 305, such as the user's home office or office workplace. When user 300 initiates a video conversation using device 320, contextual interruption avoidance system analyzes user 300's configuration parameters, and sets geo-fence 330 within a certain distance of user 300 (see FIGS. 6, 7, and corresponding text for further details). For example, the geo-fence 330 may be within 10 meters of user 300, or surround a room in which user 300 is conducting the video conversation. In one embodiment, contextual interruption avoidance system 310 resides within device 320.

In one embodiment, as shown in FIG. 3, area 305 includes multiple Internet of things (IoT) devices that provide information to contextual interruption avoidance system 310. For example, the Internet of Things devices may be located in the same room as user 300 and/or in a hallway in proximity to the room.

Contextual interruption avoidance system 310 monitors entity 340's movement while user 300 is on the video conversation. When entity 340 crosses geo-fence 330, contextual interruption avoidance system 310 identifies entity 340 and determines whether to i) send a notification based on the identity of the entity and the conversational context (business call, family call, etc.) of the video conversation or ii) invoke a diversion, such as when entity 340 is a child or pet (see FIG. 4 and corresponding text that are further details).

When contextual interruption avoidance system 310 determines to send a notification to entity 340, contextual interruption avoided system 310 sends notification 350 to entity device 360 based on user 300's configuration parameters. For example, notification 350 may inform entity 340 that user 300 is on a video conversation and to refrain from entering the room.

In situations where entity 340 does not adhere to notification 350 and enters the room, contextual interruption avoidance system 310 creates a digital replication of background view 370, which is the area viewable by device 320's camera. Then, when entity 340 enters background view 370, contextual interruption avoidance system 310 determines a conversational context of the video conversation. In one embodiment, the conversational context is set based on user 300 or is automatically derived from annotations. For example, if user 300 has a meeting annotated in a calendar, the description and the call participants derive the context and importance of the meeting. In another embodiment, contextual interruption avoidance system 310 dynamically generates the digital replication of background view 370 (static or blurry) based on identifying a contextual situation using reinforced Generative Adversarial Networks (GANs) to optimize entity obfuscation (see FIG. 5 and corresponding text for further details).

Figure 5:
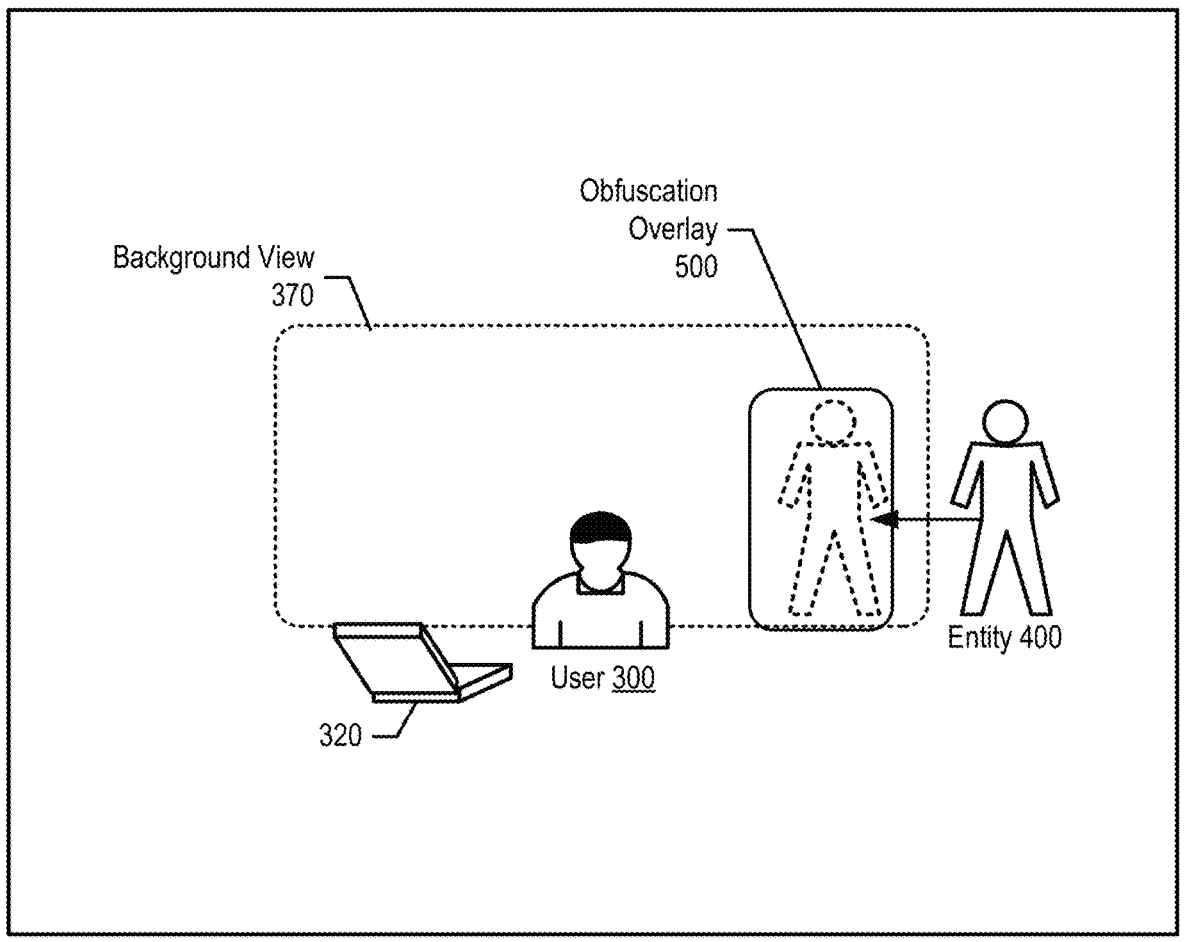
FIG. 5 is an exemplary diagram showing the contextual interruption avoidance system using an obfuscation overlay to hide an entity when the entity enters a background view.

If contextual interruption avoidance system 310 determines that the conversational context requires entity obfuscation, then contextual interruption avoidance system 310 uses the digital background replication to obfuscate entity 340 from viewers on the video conversation (see FIG. 5 and corresponding text for further details). In one embodiment, contextual interruption avoidance system 310 also performs noise cancelling steps to silence entity 340's words and/or movements. When contextual interruption avoidance system 310 determines that the conversational context does not require entity obfuscation, then contextual interruption avoidance system 310 does not obfuscate entity 340, such as when user 300 is conversing with family members (see FIG. 9 and corresponding text for further details).

In one embodiment, prior to user 300 invoking a video conversation, contextual interruption avoidance system 310 creates a digitally replicated environment of the home and identifies the suitable conversation areas (e.g., office space) from the home based on various factors. Contextual interruption avoidance system 310 then ranks all the possible home office locations inside the home for various user contextual business activity needs inclusive of but not limited to team meetings, family conversations, presentations (if the user is host, if the user is presenter, or the user is an attendee), and maps them to the corresponding conversation areas (see FIG. 6 and corresponding text for further details).

Contextual interruption avoidance system 310 further provides a configuration option for user 300 to selectively define and remove boundaries based on user identified and user preferential context using an electronic pen or a gesture on a display device. Contextual interruption avoidance system 310 may also search for IoT devices in proximity and allow user 300 to configure their functions for the contextual needs such as activating a device, identifying the nearest entities, and preparing the IoT devices to alert contextual interruption avoidance system 310 accordingly.

Figure 4:
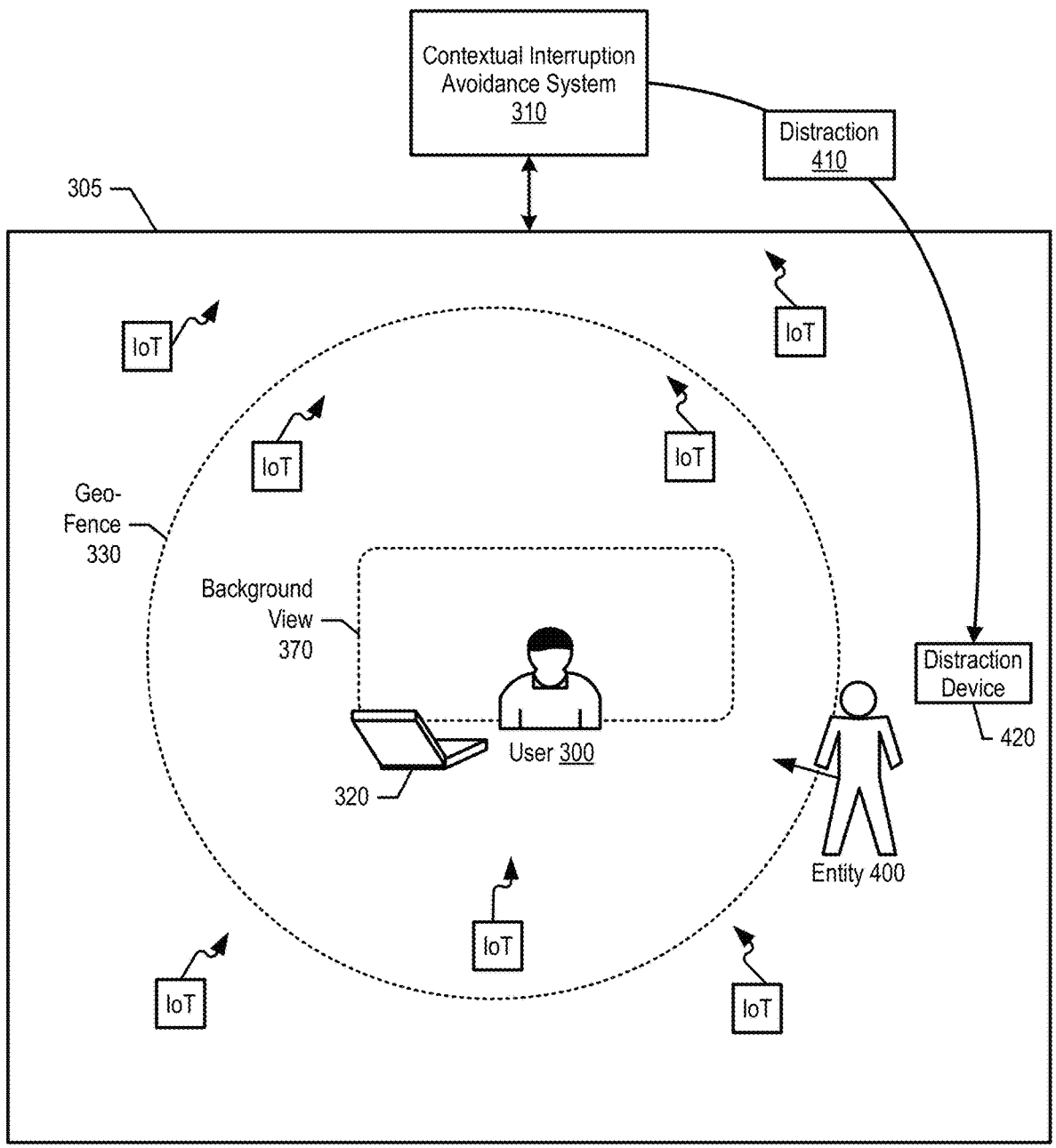
FIG. 4 is an exemplary diagram depicting a user conducting a video conversation while the contextual interruption avoidance system distracts an entity to deter the entity from interrupting the user.

FIG. 4 is an exemplary diagram depicting a user conducting a video conversation while a contextual interruption avoidance system 310 distracts an entity to deter the entity from interrupting the user. When entity 400 approaches geo-fence 330, contextual interruption avoidance system 310 identifies entity 400 and determines that entity 400 requires distracting. For example, entity 400 may be a child and contextual interruption avoidance system 310 is programmed to retrieve a history of programs watched by the child and display a favorite program on a nearby smart TV (distraction device 420). In one embodiment, contextual interruption avoidance system 310 intelligently determines distraction 410 based on the situational context of entity 400. For example, if entity 400 is running out of fear of a lizard based on analyzing entity 400's speech, contextual interruption avoidance system 310 does not display a show about lizards on distraction device 420.

In one embodiment, contextual interruption avoidance system 310 maintains a repository of other entities, pets, associated wearable home automation devices, and usage metrics of the associated devices. Contextual interruption avoidance system 310 then identifies entity 400 and determines steps to notify/distract entity 400 based on the conversational context of user 300 and situational context of entity 400.

When entity 400 enters the visual view of the camera eye (background view 370), contextual interruption avoidance system 310 overlays the digital replication on top of entity 400 as discussed herein to avoid call participants from viewing entity 400. In one embodiment, the entity obfuscation is personalized based on conversational context, such as "Meet my wife and kids" in an informal conversation as opposed to "hide the kids and if they come in the viewing area."

In an embodiment where user 300 has a positive contextual affinity or association with entity 400, such as user 300 telling entity 400 to come into the room and talk with family members, then contextual interruption avoidance system 310 does not obfuscate entity 400 when entity 400 enters background view 370.

FIG. 5 is an exemplary diagram showing contextual interruption avoidance system 310 using obfuscation overlay 500 to hide entity 400 when entity 400 enters background view 370. As discussed earlier, when entity 400 enters background view 370, contextual interruption avoidance system 310 uses a digital background replication to generate obfuscation overlay 500 and inserts obfuscation overlay 500 into the video feed transmitted by device 320. Contextual interruption avoidance system 310 dynamically updates obfuscation overlay 500 as entity 400 passes through background 370.

In one embodiment, as discussed above, contextual interruption avoidance system 310 dynamically generates the digital replication of background view 370 (static or blurry) based on identifying a contextual situation using reinforced Generative Adversarial Networks (GANs) for optimizing obfuscation. Generative adversarial networks are unsupervised neural networks that train themselves by analyzing the information from a given dataset to create new image samples. Generative adversarial networks are a type of neural network that can generate new images from a given set of images that are similar to the given dataset, yet individually different. They are composed of two neural network models, a generator and a discriminator. The generator learns to develop new samples, whereas the discriminator learns to differentiate the generated examples from the real ones. These two models work together for training the generative adversarial network to generate and distinguish new plausible samples from the existing dataset. Since generative adversarial networks learn to recognize and distinguish images, they are used in industries where computer vision plays a major role such as photography, image editing, and gaming, and many more.

When an entity enters the visual view of the camera eye (background view 370), contextual interruption avoidance system 310 obfuscates the entity by overlaying the simulated background view on top of the entity. In this embodiment, the GANs are working with real image frames in the background to continuously obfuscate the entities not intended in the frame and a discriminator ensures the image frame is not altered enough to create a non-real image. Contextual interruption avoidance system 310 manages the workflow of simulating streams of frames being fed to the GANs in a constrained manner (e.g., using the virtual context determined by a visual recognition algorithm) to identify the areas of background view 370 to be obfuscated and applying reinforcement as the output to rectify the environment errors in the form of feedback learning.

Figure 6:
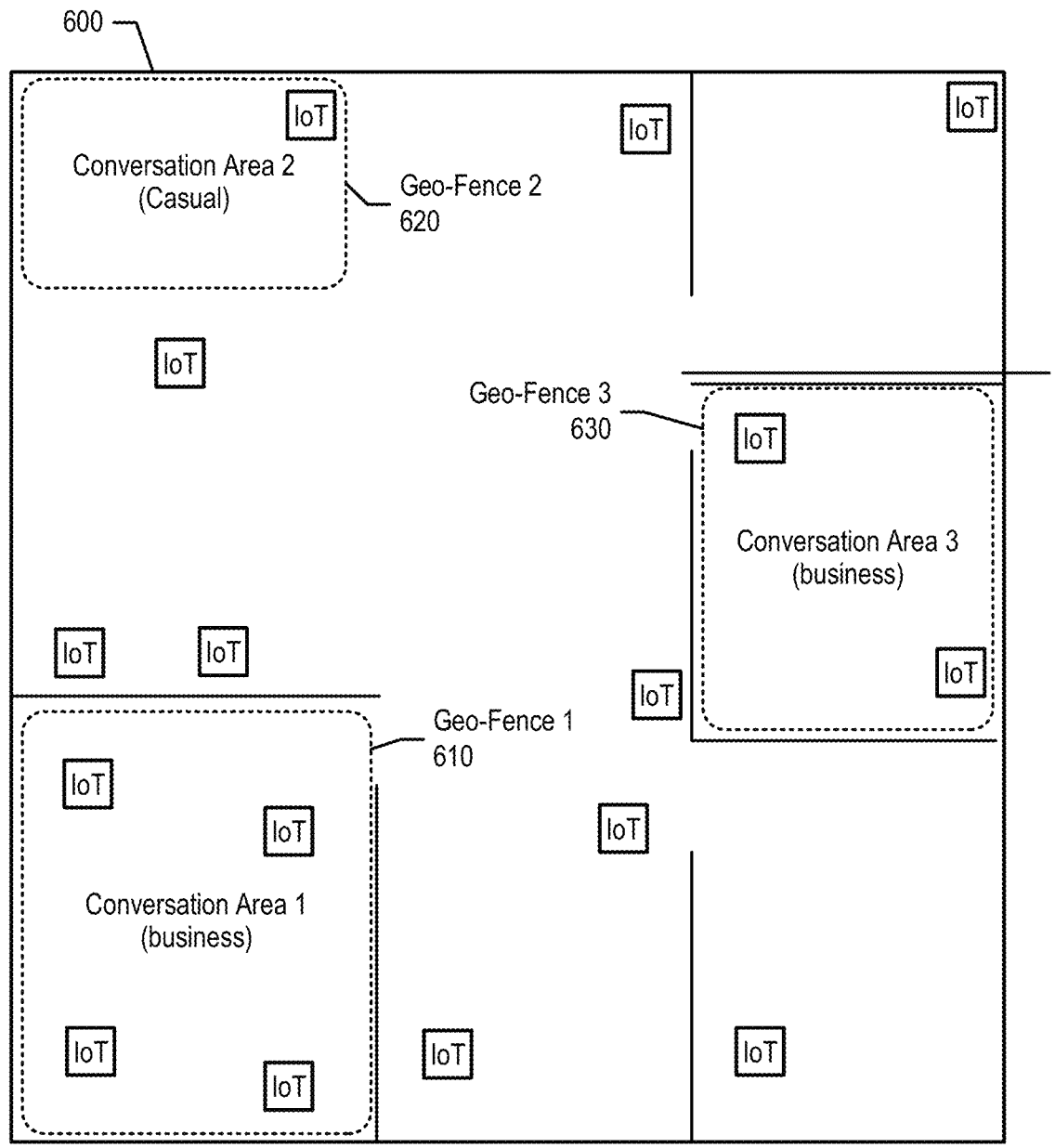
FIG. 6 is an exemplary diagram depicting an area with multiple video conversation areas.

FIG. 6 is an exemplary diagram depicting an area with multiple video conversation areas. In one embodiment, contextual interruption avoidance system 310 creates a digitally replicated environment (e.g., home) and identifies suitable home office spaces in the home based on various factors such as IoT feeds, historical data with respect to user preferences, external (traffic, noise etc.) and internal conditions of the home (children active, Elderly needs, sleep/snore noise, etc.). In this embodiment, contextual interruption avoidance system 310 generates a pattern of activities of entities inside the home extracted from the IoT feeds, home automation systems (e.g., washing clothes, gardening, cooking, etc.) from smart appliances and creates conversation area suggestions with appropriate business context that can be set for a particular time slot.

FIG. 6 shows contextual interruption avoidance system 310 identified three areas for video conversations, which are conversation area 1, conversation area 2, and conversation area 3. Contextual interruption avoidance system 310 also determined the video conversation geo-fences, which are geo-fence 1 610, geo-fence 2 620, and geo-fence 3 630.

In one embodiment, contextual interruption avoidance system 310 simulates the environment in user 300's analytics dashboard 600, which shows all the smart devices and connections to IoT enhanced devices. Then, contextual interruption avoidance system 310 ranks all the possible home office locations inside the home for various user contextual business activity needs such as for team meetings, presentations, meetings where user has to speak versus doesn't speak etc., family video conversations, etc., and maps them to user factors (see FIG. 8 and corresponding text for further details).

FIG. 7 is an exemplary diagram of a notification and distraction configuration window that user 300 utilizes to configure notifications and distractions for individual entities. User 300 enters information into window 700 to individually notify entities when entities enter a geo-fence area as discussed herein. User 300 enters a message in window 705 to inform the entities not to enter a room. The message may be dynamic in nature, such as contextual interruption avoidance system 310 evaluating a meeting entry in user 300's calendar and creating a custom message, such as "I'm on a video conversation until 3:30 pm, please do not come in the office room."

User 300 enters an entity name in box 710 and a corresponding ID in box 715. For example the ID may be the entity's phone number which contextual interruption avoidance system 310 tracks while in the home. User 300 enters contact information in boxes 720 and 725, such as the contact type and mobile phone number. Likewise user 300 may enter additional entity information in boxes 730, 735, 740, and 745. In one embodiment, user 300 may configure individual messages for each individual entity.

User 300 also enters entity information in the distractions settings area. User 300 enters the entity's name in box 750, such as a child name or pet name. User 300 then enters and ID in box 755, which may correspond to a wearable device on the pet or child. Then, user 300 enters a type of distraction to perform on the user when the user enters the geo-fence, such as turn on a toy car. Likewise, user 300 enters additional information for a different user in boxes 765, 778, and 775. User 300 selects box 790 to save the configuration settings.

In one embodiment, contextual interruption avoidance system 310 evaluates the importance of the call to determine whether to divert an entity away. A message for the approaching adult can still be dynamically customized based on the context of the call. For example, the message may be "Come in the room in 15 minutes to say hi to John, just finishing up business discussions."

Figure 8:
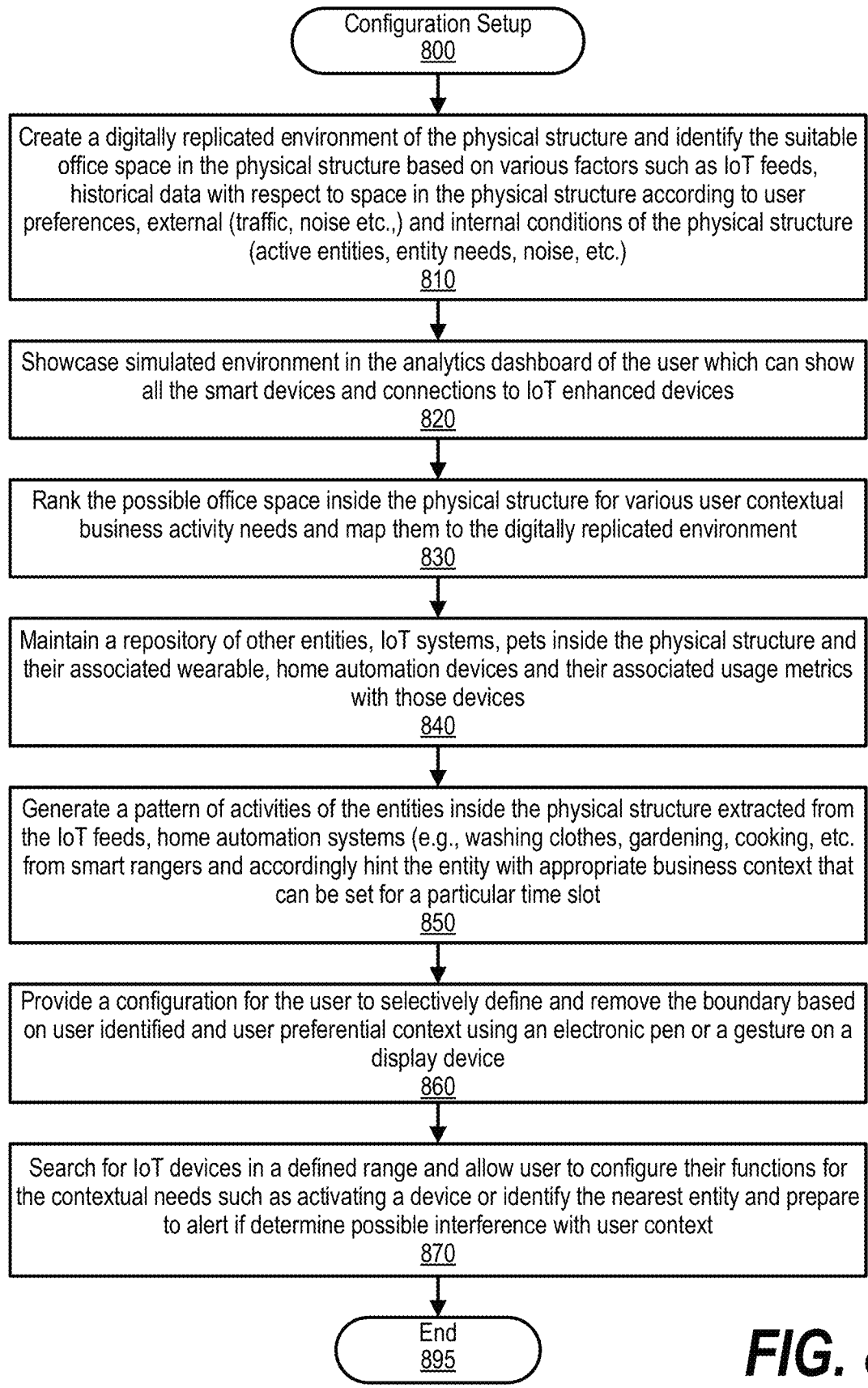
FIG. 8 is an exemplary flowchart showing steps take to configure the contextual interruption avoidance system.

FIG. 8 is an exemplary flowchart showing steps take to configure contextual interruption avoidance system 310. FIG. 8 processing commences at 800 whereupon, at step 810, the process creates a digitally replicated environment of the physical structure and identifies suitable office spaces in the physical structure based on various factors such as IoT feeds, historical data with respect to space in the physical structure and user preferences, external influences (traffic, noise, etc.), and internal conditions of the physical structure (active entities, entity needs, noise, etc.).

At step 820, the process showcases a simulated environment in an analytics dashboard of the user that shows all the smart devices and connections to IoT enhanced devices. At step 830, the process ranks the possible office spaces inside the physical structure for various user contextual business activity needs and maps them to the digitally replicated environment. In one embodiment, contextual interruption avoidance system 310 determines the office space ranking from crowdsourced data based on a cluster of entities (e.g., family members) identified in different locations. In this embodiment, the more entities that are identified and clustered in a given area using, for example, an R-CNN object detection approach, a counter is enabled to cluster all the entities in the given location and ranked in sorted order. In this embodiment, an activity recognition and entity detection model runs to identify and rank the clusters in sequential order.

At step 840, the process maintains a repository of other entities, IoT systems, pets inside the physical structure and their associated wearable, home automation devices and their associated usage metrics with those devices. At step 850, the process generates a pattern of activities of the entities inside the physical structure extracted from the IoT feeds, home automation systems (e.g., washing clothes, gardening, cooking, etc., from smart appliances) and accordingly generates hints for user 300 with appropriate business context that can be set for a particular office space location and/or time slot.

At step 860, the process provides a configuration for user 300 to selectively define and remove the geo-fence boundaries based on user identified and user preferential context using an electronic pen or a gesture on a display device. At step 870, the process searches for IoT devices in a defined range and allows user 300 to configure their functions for the contextual needs such as activating a device or identify the nearest entities and prepare to alert the entities if contextual interruption avoidance system 310 determines an upcoming possible interruption with user 300 during a video conversation. FIG. 8 processing thereafter ends at 895.

Figure 9:
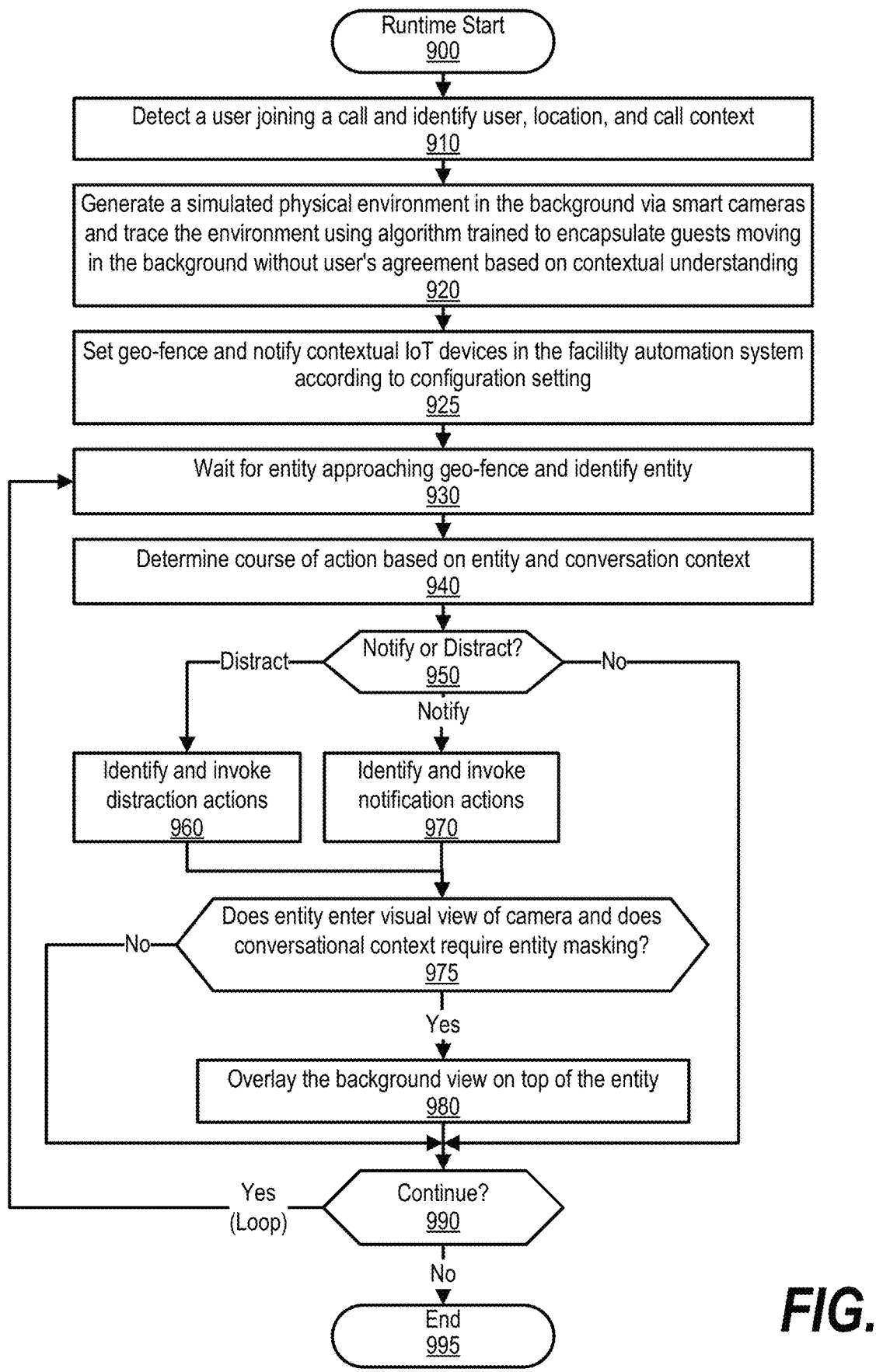
FIG. 9 is an exemplary flowchart showing steps taken to detect an entity crossing a geo-fence and notifying/distracting the entity based on contextual information.

FIG. 9 is an exemplary flowchart showing steps taken to detect an entity crossing a geo-fence and notifying/distracting the entity based on contextual information. FIG. 9 processing commences at 900 whereupon, at step 910, the process detects user 300 joining a video conversation and identifies user 300, the office space location, and contextual information regarding the video conversation (e.g., from a calendar entry).

At step 920, the process generates a simulated physical environment of user 300's background via smart cameras. The process traces the physical environment using an algorithm trained to encapsulate entities moving in the background without user 300's agreement based on contextual understanding if the video conversation (see FIG. 5 and corresponding text for further details).

At step 925, the process sets geo-fence 340 and notifies contextual IoT devices in the physical structure automation system according to configuration settings. At step 930, the process waits for an entity to approach geo-fence 340 and identifies the entity. In one embodiment, the process identifies the entity by the entities mobile device or a wearable device with a unique RFID tag (e.g., pet collar).

At step 940, the process determines a course of action based on the identified entity and the conversation context. The process determines as to whether to notify the entity (e.g., adult), distract the entity (e.g., child, pet, etc.), or perform no action (e.g., casual conversation context) (decision 950). If the process should distract the entity, then decision 950 branches to the "Distract" branch whereupon, at step 960, the process invokes distraction actions such as turning on a nearby smart TV to a preferred channel, activating a toy to move away from geo-fence 340, etc. In one embodiment, the process may also send a notification to a nearby entity, such as sending a message to another person to come and assist the entity that crossed geo-fence 340.

On the other hand, if the process should notify the entity, decision 950 branches to the "Notify" branch whereupon, at step 970, the process identifies the notification action via configuration settings and invokes the notification action, such as sending a text to the entity to not enter the office space. On the other hand, if the process should not invoke distraction actions or notification actions based on the context of the conversation, decision 950 branches to the "No" branch bypassing steps 960-980. For example, the video conversation may be a casual conversation with family members and a child enters the office space.

Once the process performs steps 960 or 970, the process determines as to whether the entity continues closer to user 300 and enters background view 370 and whether the conversational context requires entity masking (decision 975). If the entity enters background view 370 and the conversational context requires entity masking, then decision 975 branches to the 'yes' branch whereupon, at step 980, the process overlays the simulated background view on top of the entity as the entity traverses through the background to obfuscate the entity. As discussed earlier, the process may use GANs to generate the real-time overlay to obfuscate the entity. In one embodiment, the process also performs noise cancelling steps to remove any noise (words, shuffling, etc.) that the entity produces.

On the other hand, if the entity does not enter background view 370 or does not require entity masking based on the conversational context, then decision 975 branches to the 'no' branch bypassing step 980.

The process determines as to whether to continue (decision 990). If the process should continue, such as user 300 still conducting the video conversation, then decision 990 branches to the 'yes' branch which loops back to monitor user 300's surroundings for new entities and take appropriate actions. This looping continues until the process should terminate (e.g., user 300 terminates video conversation), at which point decision 990 branches to the 'no' branch exiting the loop. FIG. 9 processing thereafter ends at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
   establishing a geo-fence around a user in response to the user invoking a video conversation corresponding to a conversational context;
   in response to detecting an entity crossing the geo-fence, determining a distraction action based on the entity and the conversational context of the video conversation;
   retrieving a set of distraction preferences comprising a device identifier of a distraction device and a set of action instructions based on the entity; and
   invoking the distraction action by transmitting the set of action instructions to the distraction device using the device identifier.

2. The computer-implemented method of claim 1 further comprising:
   simulating a physical background view based on a viewing area of a camera on a device utilized by the user during the video conversation;
   detecting that the entity enters the physical background view; and
   overlaying at least a portion of the simulated physical background view into a video feed to obfuscate the entity while the entity is within the physical background view.

3. The computer-implemented method of claim 2 further comprising:
   inputting one or more video streams corresponding to the physical background view into a generative adversarial network (GAN); and
   generating the portion of the simulated physical background view based upon a set of ameliorative effects outputted from the generative adversarial network.

4. The computer-implemented method of claim 1 further comprising:
   determining that the distraction action also comprises sending a customized message to a different entity corresponding to a set of contact information; and
   sending the customized message to the different entity using the set of contact information that indicates the entity is approaching a video conversation area in which the user is located.

5. The computer-implemented method of claim 1 wherein, prior to invoking the video conversation, the method further comprises:
   creating a digitally replicated environment of a physical structure corresponding to a physical location of the user;
   mapping a set of Internet of Things (IoT) devices within the physical structure to the digitally replicated environment;
   analyzing environmental data of the physical structure that comprises entity traffic corresponding to a plurality of entities comprising the entity; and
   displaying one or more viable video conversation areas on the digitally replicated environment based on the IoT devices and the environmental data, wherein each of the one or more viable video conversation areas comprise a ranking and correspond to a conversation type selected from the group consisting of a casual video conversation and a business video conversation.

6. An information handling system comprising:
   one or more processors;
   a memory coupled to at least one of the processors;
   a set of computer program instructions stored in the memory and executed by at least one of the processors in order to perform actions of:
      establishing a geo-fence around a user in response to the user invoking a video conversation corresponding to a conversational context;
      in response to detecting an entity crossing the geo-fence, determining a distraction action based on the entity and the conversational context of the video conversation;
      retrieving a set of distraction preferences comprising a device identifier of a distraction device and a set of action instructions based on the entity; and
      invoking the distraction action by transmitting the set of action instructions to the distraction device using the device identifier.

7. The information handling system of claim 6 wherein the processors perform additional actions comprising:
   simulating a physical background view based on a viewing area of a camera on a device utilized by the user during the video conversation;
   detecting that the entity enters the physical background view; and
   overlaying at least a portion of the simulated physical background view into a video feed to obfuscate the entity while the entity is within the physical background view.

8. The information handling system of claim 7 wherein the processors perform additional actions comprising:
   inputting one or more video streams corresponding to the physical background view into a generative adversarial network (GAN); and
   generating the portion of the simulated physical background view based upon a set of ameliorative effects outputted from the generative adversarial network.

9. The information handling system of claim 6 wherein the processors perform additional actions comprising:
   determining that the distraction action also comprises sending a customized message to a different entity corresponding to a set of contact information; and
   sending the customized message to the different entity using the set of contact information that indicates the entity is approaching a video conversation area in which the user is located.

10. The information handling system of claim 6 wherein the processors perform additional actions comprising:
    creating a digitally replicated environment of a physical structure corresponding to a physical location of the user;
    mapping a set of Internet of Things (IoT) devices within the physical structure to the digitally replicated environment;
    analyzing environmental data of the physical structure that comprises entity traffic corresponding to a plurality of entities comprising the entity; and
    displaying one or more viable video conversation areas on the digitally replicated environment based on the IoT devices and the environmental data, wherein each of the one or more viable video conversation areas comprise a ranking and correspond to a conversation type selected from the group consisting of a casual video conversation and a business video conversation.

11. A computer program product stored in a non-transitory computer readable storage medium, comprising computer program code that, when executed by an information handling system, causes the information handling system to perform actions comprising:
    establishing a geo-fence around a user in response to the user invoking a video conversation corresponding to a conversational context;

in response to detecting an entity crossing the geo-fence, determining a distraction action based on the entity and the conversational context of the video conversation;

retrieving a set of distraction preferences comprising a device identifier of a distraction device and a set of action instructions based on the entity; and invoking the distraction action by transmitting the set of action instructions to the distraction device using the device identifier.

12. The computer program product of claim 11 wherein the information handling system performs further actions comprising:

simulating a physical background view based on a viewing area of a camera on a device utilized by the user during the video conversation;

detecting that the entity enters the physical background view; and overlaying at least a portion of the simulated physical background view into a video feed to obfuscate the entity while the entity is within the physical background view.

13. The computer program product of claim 12 wherein the information handling system performs further actions comprising:

inputting one or more video streams corresponding to the physical background view into a generative adversarial network (GAN); and generating the portion of the simulated physical background view based upon a set of ameliorative effects outputted from the generative adversarial network.

14. The computer program product of claim 11 wherein the information handling system performs further actions comprising:

determining that the distraction action also comprises sending a customized message to a different entity corresponding to a set of contact information; and sending the customized message to the different entity using the set of contact information that indicates the entity is approaching a video conversation area in which the user is located.

15. The computer program product of claim 11 wherein the information handling system performs further actions comprising:

creating a digitally replicated environment of a physical structure corresponding to a physical location of the user;

mapping a set of Internet of Things (IoT) devices within the physical structure to the digitally replicated environment;

analyzing environmental data of the physical structure that comprises entity traffic corresponding to a plurality of entities comprising the entity; and displaying one or more viable video conversation areas on the digitally replicated environment based on the IoT devices and the environmental data, wherein each of the one or more viable video conversation areas comprise a ranking and correspond to a conversation type selected from the group consisting of a casual video conversation and a business video conversation.

\* \* \* \* \*